US012096262B2

(12) United States Patent
Chen et al.

(10) Patent No.: US 12,096,262 B2
(45) Date of Patent: Sep. 17, 2024

(54) COMMUNICATION METHOD AND DEVICE FOR POSITIONING MEASUREMENT

(71) Applicant: Huawei Technologies Co., Ltd., Shenzhen (CN)

(72) Inventors: Lei Chen, Chengdu (CN); Peng Guan, Shenzhen (CN); Mao Yan, Chengdu (CN); Huang Huang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 17/339,698

(22) Filed: Jun. 4, 2021

(65) Prior Publication Data
US 2021/0297886 A1    Sep. 23, 2021

Related U.S. Application Data

(63) Continuation of application No. PCT/CN2019/122214, filed on Nov. 29, 2019.

(30) Foreign Application Priority Data

Dec. 4, 2018 (CN) .......................... 201811472446.9

(51) Int. Cl.
*H04W 24/10*    (2009.01)
*H04L 5/00*    (2006.01)
*H04W 72/044*    (2023.01)

(52) U.S. Cl.
CPC ........... *H04W 24/10* (2013.01); *H04L 5/0048* (2013.01); *H04W 72/046* (2013.01)

(58) Field of Classification Search
CPC .... H04L 5/0048; H04W 24/10; H04W 72/046
See application file for complete search history.

(56) References Cited

U.S. PATENT DOCUMENTS

2014/0198681 A1    7/2014 Jung et al.
2017/0366244 A1*    12/2017 Lee ................. H04B 7/024
(Continued)

FOREIGN PATENT DOCUMENTS

CN    103856894 A    6/2014
CN    104137440 A    11/2014
(Continued)

OTHER PUBLICATIONS

"Beam selection and consolidation enhancements," 3GPP TSG-RAN WG2 Meeting #103, Gothenburg, Sweden, R2-1812317 (resubmission of R2-1810265), Total 10 pages, 3rd Generation Partnership Project, Valbonne, France (Aug. 20-24, 2018).
(Continued)

*Primary Examiner* — Chi H Pham
*Assistant Examiner* — Weibin Huang
(74) *Attorney, Agent, or Firm* — Leydig, Voit & Mayer, Ltd.

(57) ABSTRACT

Embodiments of the present invention disclose a communication method and a device. The method is applied to any terminal in a positioning system that includes one or more network devices and one or more terminals. The method includes: A terminal receives a measurement indication from a network device. The terminal receives reference signals from the network device, and measures the reference signals based on the measurement indication, where the reference signals are used for positioning measurement. The terminal sends one or more groups of measurement results to the network device, where reference signals corresponding to each group of measurement results have an association relationship, and the association relationship includes that each group of measurement results is measurement results of a same receive beam. According to the embodiments of the present invention, positioning efficiency can be improved.

20 Claims, 4 Drawing Sheets

(56) References Cited

U.S. PATENT DOCUMENTS

| 2018/0049042 | A1 | 2/2018 | Yu et al. |
| 2018/0288755 | A1 | 10/2018 | Liu et al. |
| 2018/0324678 | A1* | 11/2018 | Chen ................. H04W 8/08 |
| 2019/0342807 | A1* | 11/2019 | Harada ............ H04W 36/0072 |
| 2020/0037385 | A1* | 1/2020 | Park .................. H04W 56/001 |
| 2020/0059867 | A1* | 2/2020 | Haghighat ............ H04W 52/42 |
| 2020/0162133 | A1* | 5/2020 | Harrison ............ H04W 52/248 |
| 2020/0259574 | A1* | 8/2020 | Huang ................ H04W 72/046 |

FOREIGN PATENT DOCUMENTS

| CN | 107888264 A | 4/2018 |
| CN | 108093360 A | 5/2018 |
| CN | 108702726 A | 10/2018 |
| CN | 108886398 A | 11/2018 |
| WO | 2011130054 A1 | 10/2011 |
| WO | 2013147679 A2 | 10/2013 |
| WO | 2017164220 A1 | 9/2017 |
| WO | 2018151341 A1 | 8/2018 |

OTHER PUBLICATIONS

"3rd Generation Partnership Project; Technical Specification Group Radio Access Network; NR; Requirements for support of radio resource management (Release 15)," 3GPP TS 38.133 V15.3.0, pp. 1-136, 3rd Generation Partnership Project, Valbonne, France (Sep. 2018).

"3rd Generation Partnership Project; Technical Specification Group Radio Access Network; NR; Physical layer measurements (Release 15)," 3GPP TS 38.215 V15.3.0, pp. 1-15, 3rd Generation Partnership Project, Valbonne, France (Sep. 2018).

Huawei, HiSilicon, "Details of NR positioning techniques," 3GPP TSG RAN WG1 Meeting #94bis, Chengdu, China, R1-1810152, total 11 pages, 3rd Generation Partnership Project, Valbonne, France (Oct. 8-12, 2018).

"3rd Generation Partnership Project; Technical Specification Group Radio Access Network; NR; Radio Resource Control (RRC) protocol specification (Release 15)," 3GPP TS 38.331 V15.3.0, total 445 pages, 3rd Generation Partnership Project, Valbonne, France (Sep. 2018).

"3rd Generation Partnership Project; Technical Specification Group Radio Access Network; NR; Physical layer procedures for data (Release 15)," 3GPP TS 38.214 V15.3.0, total 96 pages, 3rd Generation Partnership Project, Valbonne, France (Sep. 2018).

"3rd Generation Partnership Project; Technical Specification Group Radio Access Network; Evolved Universal Terrestrial Radio Access (E-UTRA); Physical layer; Measurements (Release 15)," 3GPP TS 36.214 V15.3.0, total 25 pages, 3rd Generation Partnership Project, Valbonne, France (Sep. 2018).

"3rd Generation Partnership Project; Technical Specification Group Radio Access Network; Study on channel model for frequencies from 0.5 to 100 GHz (Release 15)," 3GPP TR 38.901 V15.0.0, total 91 pages, 3rd Generation Partnership Project, Valbonne, France (Jun. 2018).

Dahlman et al., "5G NR: The Next Generation Wireless Access Technology," Total 469 pages, Academic Press (Aug. 17, 2018).

"Views on NR Beam Management," 3GPP TSG RAN WG1 Meeting #91, Reno, USA, R1-1720803, pp. 1-11, 3rd Generation Partnership Project, Valbonne, France (Nov. 27-Dec. 1, 2017).

"NR beam management supporting multi-gNB measurements for positioning," 3GPP TSG RAN WG1 Meeting #95, Spokane, US, R1-1813583, Total 8 pages, 3rd Generation Partnership Project, Valbonne, France (Nov. 12-16, 2018).

* cited by examiner

COMMUNICATION METHOD AND DEVICE FOR POSITIONING MEASUREMENT

CROSS-REFERENCE TO RELATED APPLICATIONS

This application is a continuation of International Application No. PCT/CN2019/122214, filed on Nov. 29, 2019, which claims priority to Chinese Patent Application No.201811472446.9, filed on Dec. 4, 2018. The disclosures of the aforementioned applications are hereby incorporated by reference in their entireties.

TECHNICAL FIELD

Embodiments of the present invention relate to the field of communications technologies, and in particular, to a communication method and a device.

BACKGROUND

With continuous development of communications technologies, communication between a terminal and a network device has become a common type of communication between devices. It is increasingly important for the network device to position the terminal, or for the terminal to request a location service, to implement a specific application. In 5th generation mobile communication (5th generation wireless communication, 5G), new radio (NR) uses beam-based wireless communication to improve efficiency of communication on a spectrum with a higher frequency. In conventional positioning, a location of a terminal may be determined by measuring an angle of departure (AOD). With application of a beam in 5G, the AOD-based positioning method is inevitably affected. This is mainly because there is a relatively large difference between a range of a transmit beam and a range of a receive beam on a high frequency and those on a relatively low frequency in the conventional method. Therefore, impact of the beam needs to be considered in 5G positioning, especially impact of a relationship between a transmit beam and a receive beam on positioning in a positioning measurement process.

SUMMARY

Embodiments of the present invention disclose a communication method and a device, to improve positioning efficiency.

According to a first aspect, a communication method is disclosed. The communication method is applied to any terminal in a positioning system including one or more network devices and one or more terminals. The terminal receives a measurement indication from the network device, receives reference signals (RS) used for positioning measurement from the network device, measures the RSs based on the measurement indication, and sends one or more groups of measurement results to the network device, where RSs corresponding to each group of measurement results have an association relationship, and the association relationship includes that each group of measurement results is measurement results of a same receive beam. Each of the one or more groups of measurement results reported by the terminal to the network device is the measurement results of a same receive beam. It can be learned that when reporting the measurement results, the terminal has considered impact of a receive beam on positioning. Therefore, the network device does not need to consider the impact of the receive beam on positioning again, so that positioning efficiency of the network device can be improved.

In an embodiment, the terminal may filter, by using a layer 1 and/or layer 3 filter, measurement results of one or more transmit beams received by using a same receive beam, to obtain M groups of measurement results, where each of the M groups of measurement results is the measurement results of a same receive beam. It can be learned that noise, interference, and the like in the measurement results may be filtered out, so that measurement results with relatively good quality can be obtained.

In an embodiment, the terminal may receive first configuration information from the network device, where the first configuration information is configuration information of the RSs. It can be learned that the terminal may determine, based on the configuration information of the RSs, when and where to detect the RSs, to measure the RSs.

In an embodiment, the first configuration information may include one or more groups of RSs, RSs in each of the one or more groups of RSs have an association relationship, and the association relationship includes that each group of RSs is measured by using a same receive beam. It can be learned that the terminal may determine, based on the first configuration information, RSs that are to be measured by using a same receive beam.

In an embodiment, the first configuration information includes one or more groups of RSs, and the terminal may receive indication signaling from the network device, where the indication signaling may indicate that RSs in each of the one or more groups of RSs have an association relationship, and the association relationship includes that each group of RSs is measured by using a same receive beam. It can be learned that the terminal may determine, based on the first configuration information and the indication signaling, RSs that are to be measured by using a same receive beam.

In an embodiment, the terminal may receive indication signaling from the network device, where the indication signaling may indicate to use a same receive beam for each time of measurement, or to use a same receive beam for measurement of RSs having an association relationship. It can be learned that the terminal may determine, based on the indication signaling, RSs that are to be measured by using a same receive beam.

In an embodiment, the association relationship further includes: the RSs corresponding to each group of measurement results or each group of RSs are/is RSs that meet any one of the following conditions: being associated with a same transmission configuration indicator (TCI) state; being in a same cell; being in a same cell group; being of a same type; being in a same RS set; having a spatial quasi co-location (QCL) relationship; having a spatial QCL relationship with a same RS; having a spatial QCL relationship with RSs in a same cell; and being associated with a TCI state including spatial QCL, where RS resources corresponding to the spatial QCL are in a same cell or have a spatial QCL relationship.

In an embodiment, the terminal may send one or more of the M groups of measurement results to the network device, so that the measurement results reported by the terminal are measurement results obtained after noise, interference, and the like are filtered out.

In an embodiment, the terminal receives second configuration information from the network device, where the second configuration information is configuration information about RS measurement and reporting, so that the terminal can determine measurement information and reported measurement results based on the second configuration information.

In an embodiment, the terminal may select, from transmit beams included in each of the M groups of measurement results, a transmit beam that meets a requirement of the second configuration information, to obtain selected M groups of measurement results; and/or select one or more groups of measurement results from the M groups of measurement results or selected M groups of measurement results based on the second configuration information. It can be learned that the reported measurement results are selected, based on the second configuration information, from the measurement results obtained after noise, interference, and the like are filtered out.

In an embodiment, the second configuration information may include at least one of a transmit beam reporting threshold, a minimum quantity of transmit beams to be reported, a maximum quantity of transmit beams to be reported, a receive beam reporting threshold, a minimum quantity of receive beams to be reported, a maximum quantity of receive beams to be reported, a quantity of measurement result groups to be reported, or a criterion for selecting a measurement result group to be reported.

According to a second aspect, a communication method is disclosed. The communication method is applied to any network device in a positioning system including at least one network device and at least one terminal. The network device sends, to the terminal, a measurement indication used to indicate the terminal to measure RSs, sends, to the terminal, the RSs used for positioning measurement, and receives one or more groups of measurement results sent by the terminal, where RSs corresponding to each group of measurement results have an association relationship, and the association relationship includes that each group of measurement results is measurement results of a same receive beam. Each of the one or more groups of measurement results reported by the terminal to the network device is the measurement results of a same receive beam. It can be learned that when reporting the measurement results, the terminal has considered impact of a receive beam on positioning. Therefore, the network device does not need to consider the impact of the receive beam on positioning again, so that positioning efficiency of the network device can be improved.

In an embodiment, the one or more groups of measurement results are one or more of M groups of measurement results obtained by the terminal by filtering, by using a layer 1 and/or layer 3 filter, measurement results of one or more transmit beams received by using a same receive beam. It can be learned that noise, interference, and the like are filtered out from the measurement results reported by the terminal, thereby improving quality of the measurement results.

In an embodiment, the network device may send first configuration information to the terminal, where the first configuration information is configuration information of the RSs. It can be learned that the terminal may determine, based on the first configuration information sent by the network device, RSs that are to be measured by using a same receive beam.

In an embodiment, the first configuration information may include one or more groups of RSs, RSs in each of the one or more groups of RSs have an association relationship, and the association relationship includes that each group of RSs is measured by using a same receive beam. It can be learned that the terminal may determine, based on the first configuration information sent by the network device, RSs that are to be measured by using a same receive beam.

In an embodiment, the first configuration information includes one or more groups of RSs, and the network device may send indication signaling to the terminal, where the indication signaling may indicate that RSs in each of the one or more groups of RSs have an association relationship, and the association relationship includes that each group of RSs is measured by using a same receive beam. It can be learned that the terminal may determine, based on the first configuration information and the indication signaling sent by the network device, RSs that are to be measured by using a same receive beam.

In an embodiment, the network device may send indication signaling to the terminal, where the indication signaling may indicate to use a same receive beam for each time of measurement, or to use a same receive beam for measurement of RSs having an association relationship. It can be learned that the terminal may determine, based on the indication signaling sent by the network device, RSs that are to be measured by using a same receive beam.

In an embodiment, the relationship further includes: the RSs corresponding to each group of measurement results or each group of RSs are/is RSs that meet any one of the following conditions: being associated with a same TCI state; being in a same cell; being in a same cell group; being of a same type; being in a same RS set; having a spatial QCL relationship; having a spatial QCL relationship with a same RS; having a spatial QCL relationship with RSs in a same cell; and being associated with a TCI state including spatial QCL, where RS resources corresponding to the spatial QCL are in a same cell or have a spatial QCL relationship.

In an embodiment, the network device may send second configuration information to the terminal, where the second configuration information is configuration information about RS measurement and reporting, so that the terminal can determine measurement information and reported measurement results based on the second configuration information sent by the network device.

In an embodiment, the one or more groups of measurement results are one or more of selected M groups of measurement results obtained by using transmit beams that are selected from transmit beams included in each of the M groups of measurement results and that meet a requirement of the second configuration information, and/or one or more groups of measurement results selected from the M groups of measurement results or selected M groups of measurement results based on the second configuration information. It can be learned that the measurement results reported by the terminal are selected, based on the second configuration information, from the measurement results obtained after noise, interference, and the like are filtered out.

In an embodiment, the second configuration information may include at least one of a transmit beam reporting threshold, a minimum quantity of transmit beams to be reported, a maximum quantity of transmit beams to be reported, a receive beam reporting threshold, a minimum quantity of receive beams to be reported, a maximum quantity of receive beams to be reported, a quantity of measurement result groups to be reported, or a criterion for selecting a measurement result group to be reported.

According to a third aspect, a terminal is disclosed. The terminal includes units configured to perform the communication method according to any one of the first aspect or the embodiments of the first aspect.

According to a fourth aspect, a network device is disclosed. The network device includes units configured to perform the communication method according to any one of the second aspect or the embodiments of the second aspect.

According to a fifth aspect, a terminal is disclosed. The terminal includes a processor, a memory, and a transceiver. The memory is configured to store program code, the processor is configured to execute the program code, and the transceiver is configured to communicate with another communications device. When the processor executes the program code stored in the memory, the processor is enabled to perform the communication method according to any one of the first aspect or the embodiments of the first aspect.

According to a sixth aspect, a network device is disclosed. The network device includes a processor, a memory, and a transceiver. The memory is configured to store program code, the processor is configured to execute the program code, and the transceiver is configured to communicate with another communications device. When the processor executes the program code stored in the memory, the processor is enabled to perform the communication method according to any one of the second aspect or the embodiments of the second aspect.

According to a seventh aspect, a readable storage medium is disclosed. The readable storage medium stores a program. When the program is run, the communication method according to any one of the first aspect or the embodiments of the first aspect is implemented, or the communication method according to any one of the second aspect or the embodiments of the second aspect is implemented.

DESCRIPTION OF EMBODIMENTS

Embodiments of the present invention disclose a communication method and a device, to improve positioning efficiency. The following provides detailed descriptions.

Figure 1:
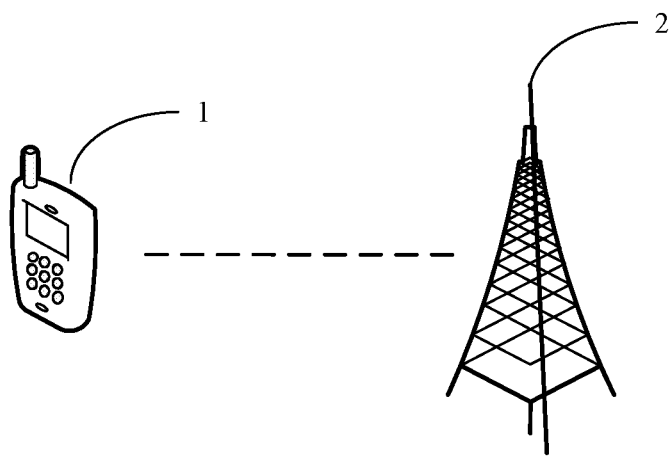
FIG. 1 is a schematic diagram of a network architecture according to an embodiment of the present invention.

To better understand the communication method and the device according to the embodiments of the present invention, the following first describes a network architecture used in the embodiments of the present invention. FIG. 1 is a schematic diagram of a network architecture according to an embodiment of the present invention. As shown in FIG. 1, the network architecture may include one or more terminals 1 (one terminal is shown in FIG. 1) and one or more network devices 2 (one network device is shown in FIG. 1).

The terminal 1 and the network device 2 may form a beam-based multi-carrier communications system, for example, 5G NR.

Communication between the terminal 1 and the network device 2 includes uplink (that is, from the terminal 1 to the network device 2) communication and downlink (that is, from the network device 2 to the terminal 1) communication. In the uplink communication, the terminal 1 is configured to send an uplink physical channel and an uplink signal to the network device 2. The network device 2 is configured to receive the uplink physical channel and the uplink signal from the terminal 1.

The uplink physical channel may include a random access channel (RACH), a physical uplink control channel (PUCCH), a physical uplink shared channel (PUSCH), and the like.

The uplink signal may include a sounding reference signal (SRS), a PUCCH demodulation reference signal (DMRS), a PUSCH DMRS, an uplink phase tracking reference signal (PTRS), and the like.

In the downlink communication, the network device 2 is configured to send a downlink physical channel and a downlink signal to the terminal 1. The terminal 1 is configured to receive the downlink physical channel and the downlink signal from the network device 2.

The downlink physical channel may include a physical broadcast channel (PBCH), a physical downlink control channel (PDCCH), a physical downlink shared channel (PDSCH), and the like.

The downlink signal may include a primary synchronization signal (PSS), a secondary synchronization signal (SSS), a PDCCH DMRS, a PDSCH DMRS, a downlink PTRS, a channel state information reference signal (CSI-RS), a cell reference signal (CRS), a time-domain or frequency-domain tracking reference signal (TRS), a positioning reference signal (PRS), and the like.

The terminal 1 may be user equipment (UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, a terminal in a evolved public land mobile network (public land mobile network, PLMN), or the like.

The network device 2 is a device that can communicate with the terminal 1, and may be a base station, a relay station, or an access point. The base station may be a base transceiver station (BTS) in a global system for mobile communications (GSM) or a code division multiple access (CDMA) network, may be a node base station (NB) in wideband code division multiple access (WCDMA), may be an evolved NB (eNB or eNodeB) in long term evolution (LTE), may be a radio controller in a cloud radio access network (CRAN) scenario, may be a base station device in a 5G network or a network device in a evolved PLMN network, or may be a wearable device or a vehicle-mounted device.

To better understand the communication method and the device according to the embodiments of the present invention, the following first defines concepts or terms used in the embodiments of the present invention.

QCL: A quasi co-location relationship is used to indicate that a plurality of resources have one or more same or similar communication features. For a plurality of resources having a quasi co-location relationship, a same or similar communications configuration may be used. For example, if two antenna ports have the quasi co-location relationship, a large-scale channel characteristic of transmitting one symbol through one port may be inferred from a large-scale channel characteristic of transmitting one symbol through the other port. The large-scale characteristic may include delay spread, an average delay, Doppler spread, a Doppler frequency shift, an average gain, a receive parameter, a receive beam number of a terminal, transmit/receive channel correlation, an angle of arrival (AOA), spatial correlation of receiver antennas, a primary AOA, an average AOA, AOA spread, and the like. Specifically, that a quasi co-location indication is used to indicate whether at least two groups of antenna ports have a quasi co-location relationship is as follows: The co-location indication is used to indicate whether CSI-RSs sent by the at least two antenna ports are from a same transmission point or beam group. The network device may notify the terminal that there is a QCL relationship between ports for sending RSs, to help the terminal receive and demodulate the RSs. For example, if the terminal can determine that there is a QCL relationship between a port A and a port B, the terminal can use, for RS measurement and demodulation on the port B, a large-scale parameter that is of an RS and that is measured on the port A. Spatial QCL is a type of QCL, and the spatial QCL may be understood from a perspective of a transmit end or a receive end. From a perspective of the transmit end, if two antenna ports have a spatial QCL relationship, beam directions corresponding to the two antenna ports are consistent in space. From a perspective of the receive end, if two antenna ports have a spatial QCL relationship, the receive end can receive, in a same beam direction, signals sent by using the two antenna ports.

Wireless communication signals need to be received and sent through antennas, and a plurality of antenna elements (antenna element) may be integrated on one panel to form an antenna panel. One radio frequency (RF) link may drive one or more antenna elements. Both the terminal and the network device may include one or more antenna panels, and each antenna panel may include one or more beams. The antenna panel may be represented as an antenna array or an antenna subarray. One antenna panel may include one or more antenna arrays/subarrays. One antenna panel may be controlled by one or more oscillators (oscillator). The RF link may be referred to as a receive channel and/or a transmit channel, a receiver branch, or the like. One antenna panel may be driven by one RF link, or may be driven by a plurality of RF links.

A beam is a communication resource, and may be a wide beam, a narrow beam, or a beam of another type. A technology for forming the beam may be a beamforming technology or another technology. The beamforming technology may be a digital beamforming technology, an analog beamforming technology, or a hybrid digital/analog beamforming technology. Different beams may be considered as different resources. The terminal and the network device may send same information or different information by using different beams. A plurality of beams having same or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. The one or more antenna ports forming the beam may be considered as one antenna port set. In a protocol, the beam can also be embodied as a spatial filter. Information about the beam may be identified by using index information. The index information may correspond to a configured resource identifier of a terminal. For example, the index information may correspond to a configured identifier (ID) or resource of a CSI-RS, or may correspond to a configured ID or resource of an uplink SRS. Alternatively, the index information may be index information explicitly or implicitly carried by using a signal or a channel carried by a beam. For example, index information of a beam may be indicated by using a synchronization signal (synchronization signal, SS) or a PBCH sent by using the beam. An identifier of the information about the beam may include an absolute index of the beam, a relative index of the beam, a logical index of the beam, an index of an antenna port corresponding to the beam, an index of an antenna port group corresponding to the beam, a time index of a downlink SS block, link (beam pair link, BPL) information or a BPL index corresponding to the beam, a transmit parameter (Tx parameter) or a Tx parameter index corresponding to the beam, a receive parameter (Rx parameter) or a Rx parameter index corresponding to the beam, a transmit weight or a transmit weight index corresponding to the beam, a weight matrix, a weight vector, a receive weight corresponding to the beam, a transmit codebook or a transmit codebook index corresponding to the beam, a receive codebook or a receive codebook index corresponding to the beam, and the like.

A beam management resource is a resource used for beam management, and may also be represented as a resource used to calculate and measure beam quality. The beam quality may include layer 1 (L1)—reference signal received power (RSRP), L1—reference signal received quality (RSRQ), and the like. The beam management resource may include an SS, a PBCH, a downlink channel measurement reference signal (RS), a tracking signal, a PDCCH DMRS, a PDSCH DMRS, an uplink channel SRS, an uplink random access signal, and the like. The beam quality is measured by using indicators such as RSRP, a block error rate (BLER), RSRQ, an RS received strength indicator (RSSI), a signal to interference plus noise ratio (SINR), a channel quality indicator (CQI), and correlation.

In NR, the network device notifies, by using a TCI state, the terminal of an association relationship between receive beams when the terminal receives RSs, for example, a relationship between a beam for receiving a CSI-RS or a synchronization signal block (SSB) and a beam for receiving a PDSCH DMRS. The network device may configure a TCI state table (corresponding to TCI-states in 38.331) by using radio resource control (RRC) higher layer signaling, and each TCI state table includes several TCI states (corresponding to a TCI-RS-set (Set) in 38.331). Each TCI state includes a TCI state ID (corresponding to a TCI-RS-SetID in 38.331), one or two QCL type indications (corresponding to QCL-type (type) A/B/C/D in 38.331), and an RS-ID corresponding to each type indication. QCL types are as follows:

QCL-Type A: {Doppler frequency shift, Doppler spread, average delay, and delay spread}
QCL-Type B: {Doppler frequency shift and Doppler spread}
QCL-Type C: {Average delay and Doppler shift}
QCL-Type D: {Spatial reception parameter}

QCL-type D represents spatial QCL. When a receive beam needs to be indicated, the network device may indicate, by using higher layer signaling or control information (for example, a PDCCH), a TCI state including spatial QCL information, and the terminal may read, based on the TCI state, an RS-ID corresponding to QCL-type D. Then, the terminal may perform receiving based on a currently maintained spatial reception configuration (receive beam) corresponding to the RS-ID. If a TCI state includes a spatial QCL indication (QCL-type D), an RS corresponding to the spatial QCL indication may be an SSB/PBCH block (block) or a periodic or semi-persistent CSI-RS.

Beam indications (TCI indications) of different downlink channels may be at different locations. A beam indication of a PDCCH is associated with one or more TCI states by using higher layer signaling tci-StatesPDCCH configured through RRC. When a quantity of associated TCI states is greater than 1, one TCI state is selected by using media access control (MAC) control element (CE) higher layer signaling. A beam indication of a PDSCH is indicated by a state associated with a TCI field in downlink control information (DCI) transmitted on the PDCCH. In the NR standard, a length of a TCI field included in DCI is 3 bits (corresponding to eight TCI states). When a quantity of TCI states included in RRC signaling is less than 8, an activated TCI state is directly mapped to the TCI field. When a quantity of TCI states included in RRC signaling is greater than or equal to 8, a maximum of eight TCI states included in mapping are indicated by using higher layer signaling. When the higher layer signaling indicates that the TCI field does not appear in the DCI, the terminal reuses a beam indication of a control channel to receive a data channel.

For uplink transmission, no spatial QCL relationship is defined in NR, and an uplink beam indication is directly implemented by using an RS resource identifier. A beam indication of a PUCCH is indicated by using an RRC parameter PUCCH-Spatial-relation-info. The RRC parameter may include one or more RS resource identifiers. When the RRC parameter includes a plurality of RS resource identifiers, one of the plurality of RS resource identifiers is selected by using a MAC CE. Content of the beam indication of the PUCCH may be an identifier of an uplink/downlink RS resource, where the identifier includes an SSB index, a CSI-RS indicator (CRI), or an SRS index. The terminal may be recommended to perform uplink transmission by using a corresponding beam for receiving/sending the downlink/uplink RS resource. Beam information of the PUSCH is configured based on an SRS index in DCI.

To better understand the communication method and the device according to the embodiments of the present invention, the following first describes an application scenario of the embodiments of the present invention. In 3rd generation partnership project (3rd generation partnership project, 3GPP) protocol release 15 (release 15), in a process of sweeping transmit beams of a base station, a terminal needs to select one to four beams from the transmit beams of the base station to perform RSRP reporting. In a process of sweeping receive beams of the terminal, the base station sends a plurality of RS resources by using only one fixed transmit beam, and the terminal trains the receive beams of the terminal by using these RS resources. The terminal does not need to report a selected receive beam and a transmit beam corresponding to the selected receive beam.

It may be determined, from the foregoing process of sweeping the transmit beams of the base station and sweeping the receive beams of the terminal, that a receive beam on a terminal side is independently selected by the terminal.

However, when the terminal performs beam-based positioning measurement, measurement results of different receive beams differ greatly. If the terminal reports only measurement results but does not specify a specific beam, a calculation error is relatively large when positioning calculation is performed on a network side by using the result reported by the terminal. Consequently, a positioning measurement error is relatively large. To improve positioning accuracy, for determining of some information such as an AOD on the terminal, the terminal needs to receive a group of transmit beams by using a same receive beam, measure related parameters, and report measurement results, so that the network device can calculate a location of the terminal by using the measurement results of the terminal.

Figure 2:
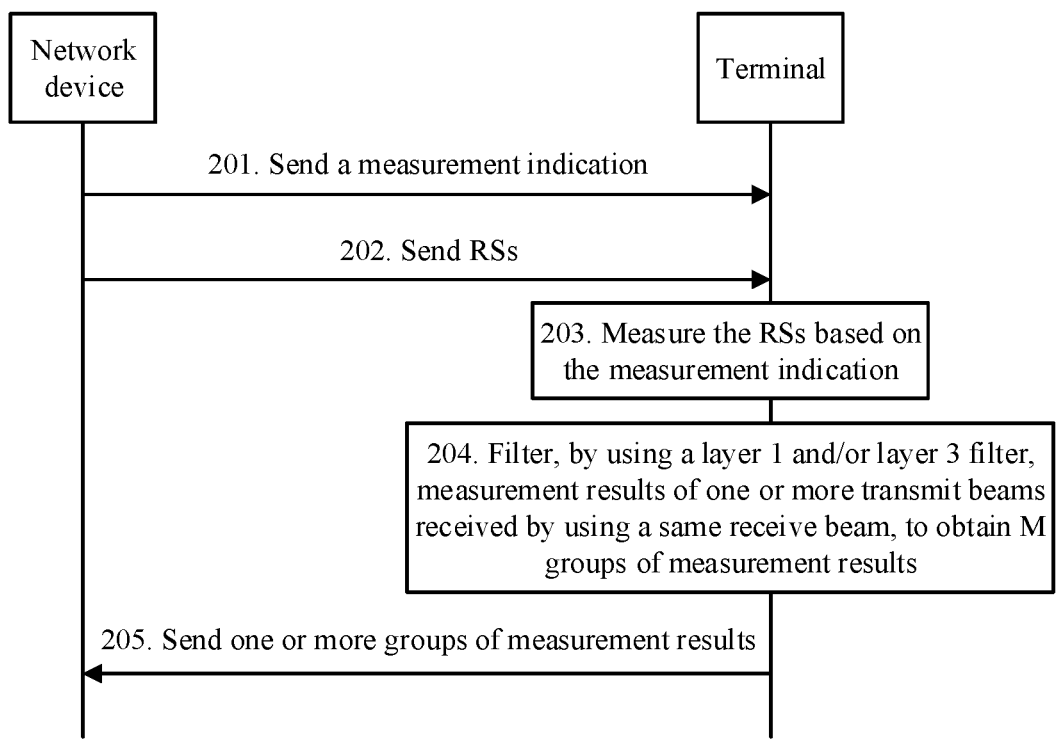
FIG. 2 is a schematic flowchart of a communication method according to an embodiment of the present invention.

Based on the network architecture shown in FIG. 1, FIG. 2 is a schematic flowchart of a communication method according to an embodiment of the present invention. As shown in FIG. 2, the communication method may include the following steps.

201. A network device sends a measurement indication to a terminal.

When the network device requires the terminal to perform measurement, the network device needs to send the measurement indication to the terminal, so that the terminal starts to measure RSs based on the measurement indication.

Specifically, the measurement indication may be indicated by using a PDCCH, or may be indicated by using higher layer signaling. The higher layer signaling may be MAC CE signaling or RRC signaling. If the measurement indication is indicated by using higher layer signaling, a time difference between receiving the measurement indication by the terminal and receiving the RSs needs to be considered. If the network device uses dedicatedly configured RSs used for positioning measurement, the terminal needs to receive the RSs after the terminal receives the higher layer signaling.

If the measurement indication is indicated by using a PDCCH, the RSs and the PDCCH may be sent in a same slot or subframe.

A specific configuration manner is not limited in this application.

202. The network device sends the RSs used for positioning measurement to the terminal.

When the network device requires the terminal to perform positioning measurement, or the terminal needs to perform positioning measurement, the network device may configure, for the terminal, the RSs used for positioning measurement, and send the configured RSs to the terminal. The positioning measurement may be one or more of angle measurement, time of arrival measurement, signal quality measurement, angle of arrival measurement, time difference of arrival measurement, angle difference of arrival measurement, and the like. The signal quality measurement may include one or more of RSRQ, RSRP, an RS SI, and the like.

The RSs used for positioning measurement include but are not limited to a PRS, a TRS, a CSI-RS, and a DMRS. A specific RS used for positioning measurement may be defined in a protocol, or may be configured by the network device. A specific method is not limited in this application.

203. The terminal measures the RSs based on the measurement indication.

The terminal measures the RSs based on the received measurement indication. The measurement herein includes one or more of the foregoing types of positioning measurement, and details are not described herein again.

In an embodiment, the network device may further configure first configuration information and second configuration information for the terminal, and send the first configuration information and the second configuration information to the terminal. The first configuration information and the second configuration information may be configured during an RRC connection, and sent by using RRC signaling, or may be configured at another time point and sent in another manner. For example, the first configuration information and the second configuration information may be sent in a form of lightweight presentation protocol (LPP) signaling or an LPP message in an LTE LPP, or may be sent in a form of new radio positioning protocol (NRPP) signaling or an NRPP message in a 5G NRPP.

The first configuration information is configuration information of the RSs. The configuration information of each RS may include one or more of generation information of the RS, type information, port information, time-frequency resource information, a resource index of the RS, information about a cell in which the RS is located, a bandwidth part (BWP) in which the RS is located, information about a frequency at which the RS is located, time domain density information, sequence generation information, periodicity information, QCL information, timing synchronization information, power configuration information, a subcarrier spacing, cell space indication information, power (or a power offset), grouping information of the RS, and the like. The generation information is information used to generate the RS, for example, generate an initial value of a sequence. The type information is used to indicate a type, for example, a CSI-RS or an SSB, of an RS. The port information is used to indicate information about a port used by an RS, for example, a port 1, 2, 4, or 8 used by the RS. The time-frequency resource information is used to indicate time domain and frequency domain positions of a resource element (RE) occupied by an RS. The time domain density information is used to indicate a periodicity, a period size, a period offset, and a quantity of symbols or slots included in each period of a time domain resource occupied by an RS. The QCL information is used to indicate a QCL relationship between RSs, for example, spatial QCL. The timing synchronization information is a timing anchor to be used for receiving an RS, for example, an SSB resource or a CSI-RS resource. The power configuration information is used to indicate a transmit power of an RS or a power offset between an RS and another RS. The cell space indication information is used to indicate, to the terminal, cells in which receiving can be performed by using a same receive beam or receive panel, and a form may be cell grouping. For example, cells in which receiving is performed by using a same receive beam or receive panel may be grouped into one group, and group content may be a physical ID of a cell, a cell ID, or the like. The power or power offset is used to calculate path loss and identify a non-line-of-sight (NLOS). The grouping information of an RS may include a group of RSs having a QCL relationship. In other words, the RSs having the QCL relationship form one group. The grouping information of an RS may alternatively be another grouping indication, for example, RSs received by using a same receive beam. Specifically, an RS grouping method is not limited in this application.

The second configuration information is configuration information about RS measurement and reporting, and may include one or more of a measurement rule, a measurement configuration, measurement assistance information, a measurement mode, a set of beam resources that need to be measured, a quantity of beam resources that need to be measured, cells that need to be measured, an identifier set of cells that need to be measured, a quantity of cells that need to be measured, a signal quality threshold for beam reporting, a quantity of measurement results to be reported, and the like. The signal quality threshold for beam reporting may include a transmit beam reporting threshold and/or a receive beam reporting threshold. The quantity of measurement results to be reported may include one or more of a minimum quantity of transmit beams to be reported, a maximum quantity of transmit beams to be reported, a minimum quantity of receive beams to be reported, a maximum quantity of receive beams to be reported, a quantity of measurement result groups to be reported, and a criterion for selecting a measurement result group to be reported.

The minimum quantity of transmit beams to be reported is a minimum quantity of transmit beams that need to be reported, and may be a quantity of all reported transmit beams, or may be a quantity of transmit beams that need to be reported and that correspond to each group of measurement results. The maximum quantity of transmit beams to be reported is a maximum quantity of transmit beams that need to be reported, and may be a quantity of all reported transmit beams, or may be a quantity of transmit beams that need to be reported and that correspond to each group of measurement results. A measurement result of a receive beam that needs to be reported needs to be greater than the receive beam reporting threshold. Filtered values of all measurement results of the receive beam that needs to be reported may need to be greater than the receive beam reporting threshold. The minimum quantity of receive beams to be reported is a minimum quantity of receive beams that need to be reported. The maximum quantity of receive beams to be reported is a maximum quantity of receive beams that need to be reported. The criterion for selecting a measurement result group to be reported may be any one of the following: there is a maximum quantity of RSs, there is a strongest signal strength, there is a maximum quantity of RSs and an RS signal strength is strong, a signal strength is greater than a threshold, and the like.

The second configuration information may include a transmit beam reporting threshold, may include a transmit beam reporting threshold and a minimum quantity of transmit beams to be reported, may include a transmit beam reporting threshold and a maximum quantity of transmit beams to be reported, may include a transmit beam reporting threshold, a minimum quantity of transmit beams to be reported, and a maximum quantity of transmit beams to be reported, may include a receive beam reporting threshold, may include a receive beam reporting threshold and a minimum quantity of receive beams to be reported, may include a receive beam reporting threshold and a maximum quantity of receive beams to be reported, may include a receive beam reporting threshold, a minimum quantity of receive beams to be reported, and a maximum quantity of receive beams to be reported, may include a criterion for selecting a measurement result group to be reported, may include a quantity of measurement result groups to be reported, or may include another combination of the foregoing information. This is not limited in this embodiment.

It should be understood that the measurement indication is used to indicate the terminal to perform positioning measurement. Before performing positioning measurement, the network device needs to send the configuration information of the RSs to the terminal, in other words, send the first configuration information to the terminal. The first configuration information usually needs to be configured before the measurement indication is sent. When receiving the measurement indication, the terminal already obtains the configuration information of the RSs that need to be measured.

Therefore, when performing RS measurement, the terminal measures, based on the measurement indication, the RSs configured by using the first configuration information.

The measurement indication and the first configuration information may be both sent to the terminal, or may be sent separately. For example, the measurement indication is sent to the terminal by using the PDCCH, and the first configuration information may be sent to the terminal by using an RRC signaling or a MAC CE signaling. This is not specifically limited in this application.

Further, after performing the RS measurement, the terminal obtains one or more RS measurement results. To facilitate the terminal to report the measurement results, the network device needs to configure, for the terminal, the configuration information, namely, the second configuration information, about RS measurement and reporting. The terminal device may perform layer 1 or layer 3 filtering on the measured RSs by using the second configuration information, to determine measurement results that need to be reported.

The first configuration information and the second configuration information may be both configured, for example, may be configured in a message, for example, configured by using the RRC signaling. Alternatively, the first configuration information and the second configuration information may be separately configured by using separate RRC messages, or may be separately configured by using separate MAC CE signaling. This is not limited in this application.

For example, the second configuration information includes the measurement rule, and the measurement rule is performing measurement by using a first path or a strongest path. In this case, the terminal needs to measure only an RS in the first path or the strongest path, and does not need to measure RSs in all channel paths. Specifically, the terminal may estimate a channel by using RSs, and then may select a channel with maximum power, a maximum SINR, or a maximum sum of power and an SINR as the strongest path, or may select a channel with a minimum delay in channels whose power is greater than a power threshold and/or whose SINR is greater than a signal to interference plus noise ratio threshold as the first path. The power threshold and/or the SINR threshold may be determined by the terminal, or may be determined by the network device. When there are a plurality of measurement rules, after determining a to-be-used measurement rule, the terminal may send the determined measurement rule to the network device. In addition, the terminal may send other related information to the network device together. For example, when performing measurement by using the first path, the terminal may send delay information, SINR information, confidence, and the like of the first path to the network device together.

204. The terminal filters, by using a layer 1 and/or layer 3 filter, measurement results of one or more transmit beams received by using a same receive beam, to obtain M groups of measurement results.

A measurement quantity of the measurement results may include one or more of RSRP, RSRQ, an RSSI, an SINR, and the like. In the measurement results obtained by the terminal through measurement, different RSs have different quality due to different transmission channels when the terminal receives the RSs, and different signal quality leads to different positioning measurement results. Therefore, to obtain a measurement result with relatively good quality, after measuring the RSs to obtain the measurement results, the terminal may filter, by using the layer 1 and/or layer 3 filter, the measurement results of one or more transmit beams received by a same receive beam, to obtain the M groups of measurement results, so that the terminal can report measurement results filtered by the layer 1 and/or layer 3 filter. The layer 1 and/or layer 3 filter may be configured by the terminal, or may be configured by the network device. M is an integer greater than or equal to 1.

Figure 3:
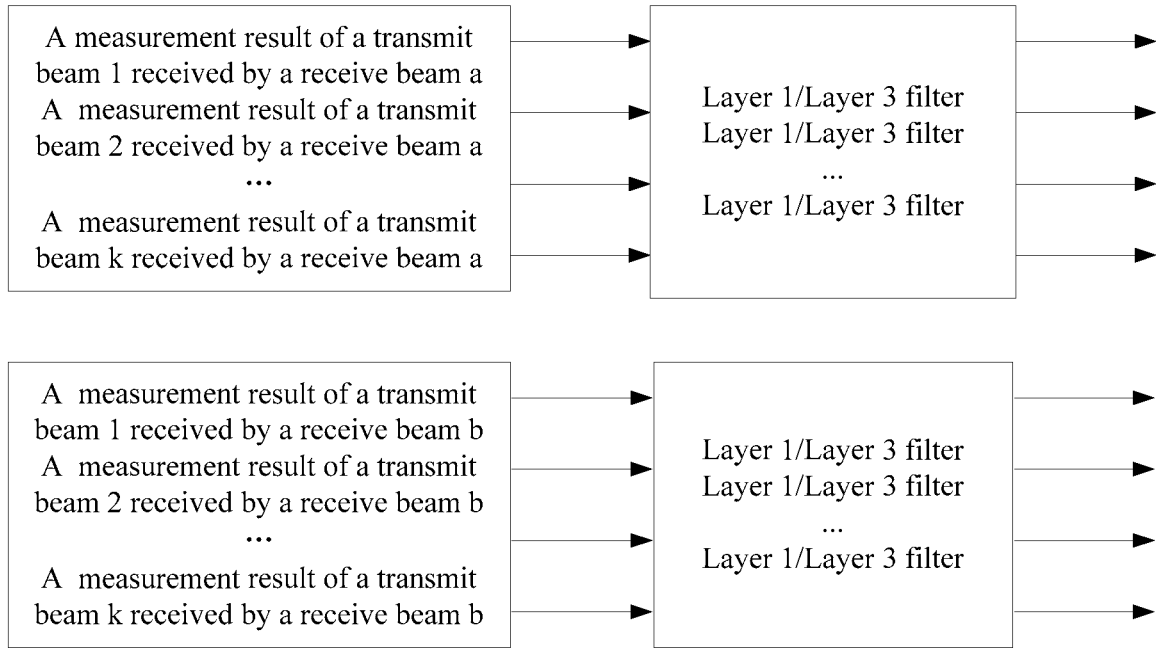
FIG. 3 is a schematic diagram of performing filtering by using a layer 1 and/or layer 3 filter according to an embodiment of the present invention.

FIG. 3 is a schematic diagram of performing filtering by using a layer 1 and/or layer 3 filter according to an embodiment of the present invention. As shown in FIG. 3, before the measurement results are filtered, the measurement results first need to be grouped. To be specific, the measurement results obtained through measurement performed by using a same receive beam are grouped into one group. That is, grouping is performed by using a receive beam as a unit. Therefore, measurement performed by using receive beams of a specific quantity is grouped into groups of the specific quantity. Then, each group of measurement results is filtered by using the layer 1 and/or layer 3 filter.

When performing layer 1 and/or layer 3 filtering, the terminal performs filtering by using a same signal quality threshold as a reference for RSs measured by using a same receive beam, and selects, based on a configuration of the second configuration information, measurement results that meet a configuration requirement. Measurement results required by a symbol include, for example, N measurement results obtained through measurement performed by using a same receive beam, where N is an integer greater than or equal to 1, or measurement results that are of all beams of a same receive beam and that are greater than a signal quality threshold, or measurement results of all beams detected by using a same receive beam. Specifically, this depends on a configuration or a protocol definition, and is not limited in this application.

It should be understood that the foregoing layer 1 and/or layer 3 filtering may be an independently performed step, and does not depend on the foregoing steps, so that a layer 1 and/or layer 3 filtering solution is independently formed.

205. The terminal sends one or more groups of measurement results to the network device.

After the terminal filters, by using the layer 1 and/or layer 3 filter, the measurement results of the one or more transmit beams received by a same receive beam, to obtain the M groups of measurement results, the terminal may select and report one or more groups of measurement results from the M groups of measurement results to the network device. However, in one or more groups of measurement results reported by the terminal to the network device, RSs corresponding to each group of measurement results need to have an association relationship, and the association relationship includes that each group of measurement results is measurement results of a same receive beam. In addition, the association relationship further includes: the RSs corresponding to each group of measurement results are RSs that meet any one of the following conditions: being associated with a same TCI state; being in a same cell; being in a same cell group; being of a same type; being in a same RS set; having a spatial QCL relationship; having a spatial QCL relationship with a same RS; having a spatial QCL relationship with RSs in a same cell; and being associated with a TCI state including spatial QCL, where RS resources corresponding to the spatial QCL are in a same cell or have a spatial QCL relationship.

The one or more of the M groups of measurement results are selected and reported to the network device. One or more selected measurement results of the M groups of measurement results may be obtained by selecting, from transmit beams included in each of the M groups of measurement results, transmit beams that meet requirements of the second configuration information and the association relationship, for reporting. Alternatively, the one or more of the M groups of measurement results may be selected based on the second configuration information and the association relationship for reporting. Alternatively, selected M groups of measurement results may be obtained by first selecting, from transmit beams included in each of the M groups of measurement results, transmit beams that meet requirements of the second configuration information and the association relationship, and then one or more of the selected M groups of measurement results are selected based on the second configuration information for reporting.

Figure 4:
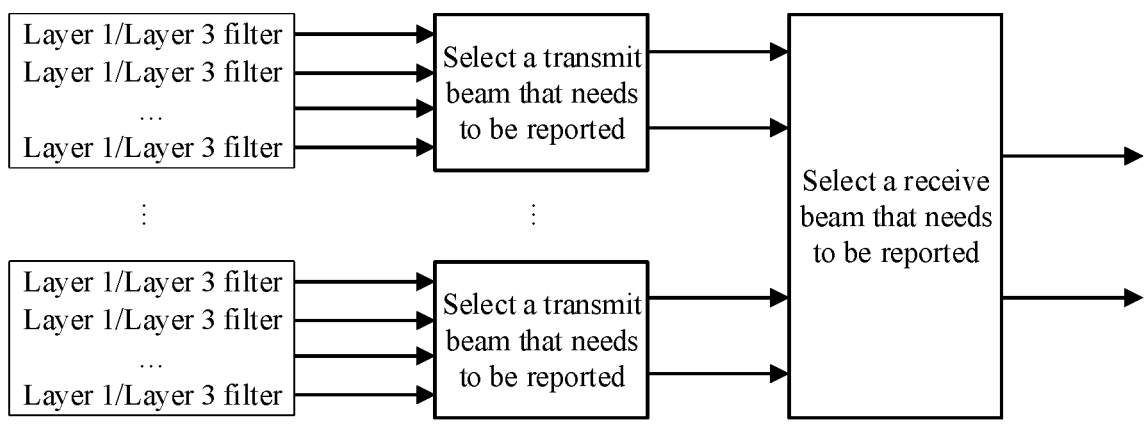
FIG. 4 is a schematic diagram of selecting a measurement result according to an embodiment of the present invention.

FIG. 4 is a schematic diagram of selecting a measurement result according to an embodiment of the present invention. As shown in FIG. 4, when second configuration information includes one or more of a transmit beam reporting threshold, a minimum quantity of transmit beams to be reported, or a maximum quantity of transmit beams to be reported, for each of M groups of measurement results, transmit beams that meet a reporting condition may be selected from transmit beams based on at least one of the transmit beam reporting threshold, the minimum quantity of transmit beams to be reported, or the maximum quantity of transmit beams to be reported, and then new M groups of measurement results are obtained. For example, when the second configuration information includes the transmit beam reporting threshold, but does not include the minimum quantity of transmit beams to be reported and the maximum quantity of transmit beams to be reported, a transmit beam whose measurement result is greater than the transmit beam reporting threshold is selected from transmit beams included in a first group of measurement results as a transmit beam to be reported of the first group of measurement results, where the first group of measurement results is any one of the M groups of measurement results. When the second configuration information further includes at least one of a receive beam reporting threshold, a minimum quantity of receive beams to be reported, or a maximum quantity of receive beams to be reported, receive beams may continue to be selected from the obtained new M groups of measurement results, to finally obtain one or more groups of measurement results that need to be reported.

Measurement results obtained by using a layer 1 and/or layer 3 filter are grouped by using a receive beam as a unit. Therefore, transmit beam selection may be mainly selecting measurement results of different transmit beams for a same receive beam, to reduce a quantity of measurement results to be reported. In this way, reporting redundancy can be reduced.

Receive beam selection is performed mainly to ensure measurement quality. When the second configuration information includes the receive beam reporting threshold, measurement results of a plurality of transmit beams corresponding to one receive beam may be first filtered, and when obtained beam quality is greater than the receive beam reporting threshold, a group of the measurement results can be reported. The filtering herein is a generalized filtering operation, and may be linear averaging, taking a maximum value in measurement results, or the like.

The terminal may further send, to the network device, information, for example, a TCI state index, a CSI-RS resource index, an SRS resource index, and carrier information and BWPs corresponding to these indexes, about a receive beam corresponding to one or more groups of measurement results. When the foregoing information does not include the carrier information, the network device may consider, by default, the carrier information corresponding to these indexes as carrier information of a primary cell in a current serving cell. In addition, the terminal may further send coordinate information of the terminal to the network device, for example, orientation information of the terminal, orientation information of an antenna panel of the terminal, and relative spatial information or absolute spatial information for receiving or sending an uplink RS or a downlink RS. The spatial information may be obtained through signal measurement, a sensor, and the like.

Figure 5:
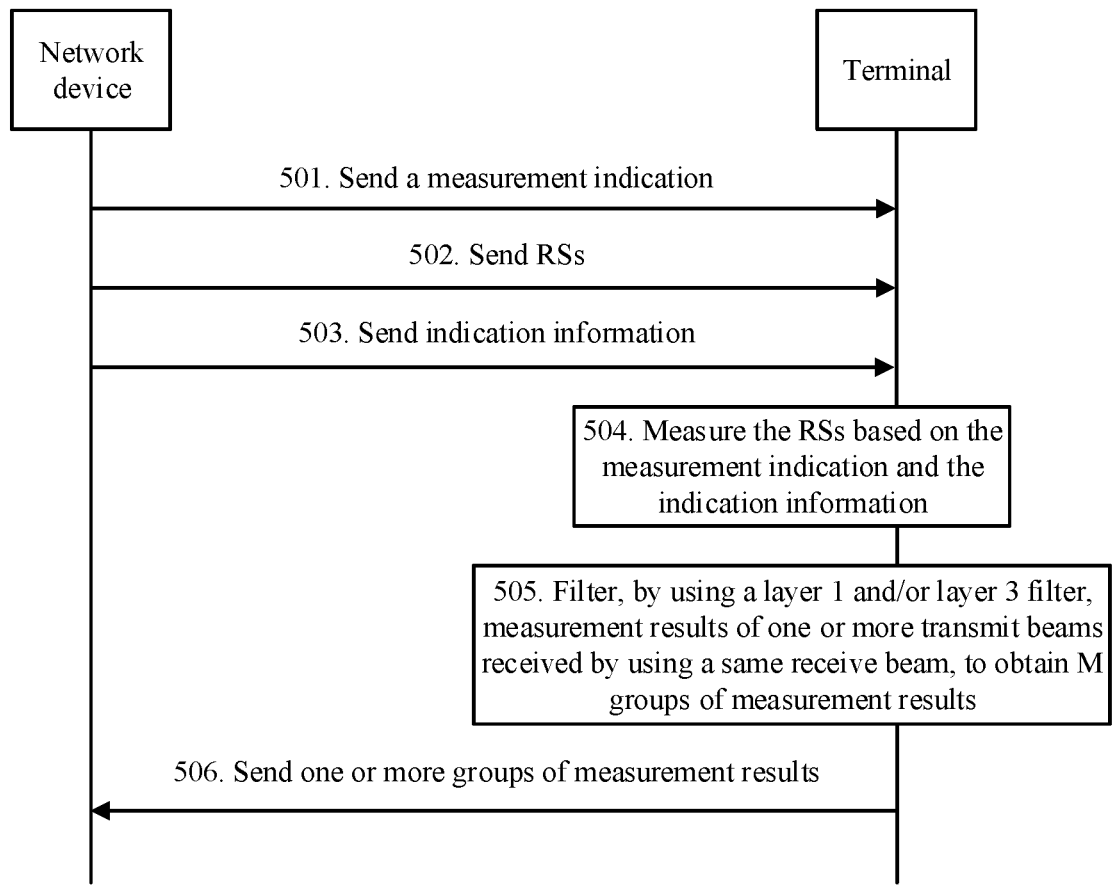
FIG. 5 is a schematic flowchart of another communication method according to an embodiment of the present invention.

Based on the network architecture shown in FIG. 1, FIG. 5 is a schematic flowchart of a communication method according to an embodiment of the present invention. As shown in FIG. 5, the communication method may include the following steps.

501. A network device sends a measurement indication to a terminal.

Step 501 is the same as step 201. For detailed descriptions, refer to step 201. Details are not described herein again.

502. The network device sends RSs used for positioning measurement to the terminal.

Step 502 is the same as step 202. For detailed descriptions, refer to step 202. Details are not described herein again.

503. The network device sends, to the terminal, indication information used to indicate to perform measurement by using a same receive beam.

The network device may configure, for the terminal, the indication information used to indicate the terminal to perform measurement by using a same receive beam, and send the indication information to the terminal.

In an embodiment, the indication information may be first configuration information. The first configuration information is configuration information of the RSs. The configuration information of each RS may include one or more of generation information of the RS, type information, port information, time-frequency resource information, a resource index of the RS, information about a cell in which the RS is located, a BWP in which the RS is located, information about a frequency at which the RS is located, time domain density information, sequence generation information, periodicity information, QCL information, timing synchronization information, power configuration information, a subcarrier spacing, cell space indication information, power (or a power offset), grouping information of the RS, and the like. Specific explanations of the configuration information of the RSs are the same as those described above. For detailed descriptions, refer to step 203. Details are not described herein again.

The first configuration information may include one or more groups of RSs. RSs in each of the one or more groups of RSs have an association relationship. The association relationship may include that each group of RSs is measured by using a same receive beam. The association relationship may further include first information. The first information is that each group of RSs is RSs that meet a first condition. The first condition is any one of the following conditions: being associated with a same TCI state; being in a same cell; being in a same cell group; being of a same type; being in a same RS set; having a spatial QCL relationship; having a spatial QCL relationship with a same RS; having a spatial QCL relationship with RSs in a same cell; and being associated with a TCI state including spatial QCL, where RS resources corresponding to the spatial QCL are in a same cell or have a spatial QCL relationship.

When the network device configures the first configuration information, if the RSs have been clearly grouped based on the first information, the association relationship may not include the first information. When the network device configures the first configuration information, if the RSs are not clearly grouped based on the first information, the association relationship must include the first information, so that the terminal determines, based on the first information, RSs that are in a same group in RSs that need to be measured, to further determine RSs that need to be measured by using a same receive beam. A manner of configuring and sending the first configuration information may be the same as that in step 203. For detailed descriptions, refer to step 202. Details are not described herein again.

In an embodiment, the indication information may include the first configuration information and indication signaling, and the first configuration information is configuration information of the RSs. The first configuration information may include one or more groups of RSs, the indication signaling is used to indicate that there is an association relationship between RSs in each of one or more groups of RSs included in the first configuration information, and the association relationship includes that each group of RSs is measured by using a same receive beam. The indication signaling may be dynamic signaling, and may be sent by using a PDCCH. Manners of configuring and sending the first configuration information is the same as the foregoing descriptions, and the configuration information of the RSs is the same as that described above. Details are not described herein again.

Same as the foregoing descriptions, when the network device configures the first configuration information, if the RSs have been clearly grouped based on first information, the association relationship may not include the first information. When the network device configures the first configuration information, if the RSs are not clearly grouped based on the first information, the association relationship must include the first information, so that the terminal determines, based on the first information, RSs that are in a same group in RSs that need to be measured, to further determine RSs that need to be measured by using a same receive beam. The first information is the same as the foregoing information, and details are not described herein again.

In an embodiment, the indication information may be indication signaling, and the indication signaling may indicate to use a same receive beam for each time of measurement, or to use a same receive beam for measurement of RSs having an association relationship. The association relationship includes first information. The association relationship may be sent by the network device to the terminal, or may be defined by a protocol. This is not limited in this embodiment. The indication signaling may be sent by using higher layer signaling, for example, RRC or MAC CE signaling, or may be indicated on a PDCCH. When the indication signaling is indicated by using the PDCCH, the association relationship of the RSs has already configured, and the indication signaling only indicates that a same receive beam is used, or indicates a specifically used receive beam. The first information is the same as the foregoing information, and details are not described herein again.

504. The terminal measures the RSs based on the measurement indication and the indication information.

The network device may further configure second configuration information for the terminal, and send the second configuration information to the terminal. The second configuration information is the same as the second configuration information in the foregoing embodiment, and details are not described herein again.

After receiving the RSs, the indication information, and the measurement indication from the network device, the terminal measures the RSs based on the measurement indication and the indication information, in other words, starts to measure the RSs based on the second configuration information and the indication information. To be specific, RSs that meet a condition of being measured by using a same receive beam are measured by using a same receive beam. For example, RSs in a same group may be measured by using a same receive beam, and RSs in different groups may be measured by using different receive beams, or may be measured by using a same receive beam. For example, RSs that meet a same association relationship may be measured by using a same receive beam, and RSs that meet different association relationships may be measured by using different receive beams, or may be measured by using a same receive beam. However, a specific receive beam used for measurement may be determined by the terminal, or may be determined based on other information provided by the network device. For example, the network device may indicate that a group of RSs and a specific SS block or CSI-RS resource are in a spatial QCL relationship. In this case, the terminal may determine a receive beam based on the SS block or the CSI-RS resource.

505. The terminal filters, by using a layer 1 and/or layer 3 filter, measurement results of one or more transmit beams received by using a same receive beam, to obtain M groups of measurement results.

Step 505 is the same as step 204. For detailed descriptions, refer to step 204. Details are not described herein again.

506. The terminal sends one or more groups of measurement results to the network device.

After the terminal filters, by using the layer 1 and/or layer 3 filter, the measurement results of the one or more transmit beams received by using a same receive beam, to obtain the M groups of measurement results, one or more selected measurement results of the M groups of measurement results may be obtained by selecting, from transmit beams included in each of the M groups of measurement results, transmit beams that meet requirements of the second configuration information, for reporting. Alternatively, the one or more of the M groups of measurement results may be selected based on the second configuration information for reporting. Alternatively, selected M groups of measurement results may be obtained by first selecting, from transmit beams included in each of the M groups of measurement results, transmit beams that meet requirements of the second configuration information, and then one or more of the selected M groups of measurement results are selected based on the second configuration information for reporting.

FIG. 4 is a schematic diagram of selecting a measurement result according to an embodiment of the present invention. As shown in FIG. 4, when second configuration information includes one or more of a transmit beam reporting threshold, a minimum quantity of transmit beams to be reported, or a maximum quantity of transmit beams to be reported, for each of M groups of measurement results, transmit beams that meet a reporting condition may be selected from transmit beams based on at least one of the transmit beam reporting threshold, the minimum quantity of transmit beams to be reported, or the maximum quantity of transmit beams to be reported, and then new M groups of measurement results are obtained. For example, when the second configuration information includes the transmit beam reporting threshold, but does not include the minimum quantity of transmit beams to be reported and the maximum quantity of transmit beams to be reported, a transmit beam whose measurement result is greater than the transmit beam reporting threshold is selected from transmit beams included in a first group of measurement results as a transmit beam to be reported of the first group of measurement results, where the first group of measurement results is any one of the M groups of measurement results. When the second configuration information further includes at least one of a receive beam reporting threshold, a minimum quantity of receive beams to be reported, or a maximum quantity of receive beams to be reported, receive beams may continue to be selected from the obtained new M groups of measurement results, to finally obtain one or more groups of measurement results that need to be reported.

Measurement results obtained by using a layer 1 and/or layer 3 filter are grouped by using a receive beam as a unit. Therefore, transmit beam selection may be mainly selecting measurement results of different transmit beams for a same receive beam, to reduce a quantity of measurement results to be reported. In this way, reporting redundancy can be reduced.

Receive beam selection is performed mainly to ensure measurement quality. When the second configuration information includes the receive beam reporting threshold, measurement results of a plurality of transmit beams corresponding to one receive beam may be first filtered, and when obtained beam quality is greater than the receive beam reporting threshold, a group of the measurement results can be reported. The filtering herein is a generalized filtering operation, and may be linear averaging, taking a maximum value in measurement results, or the like.

The terminal may further send, to the network device, information, for example, a TCI state index, a CSI-RS resource index, an SRS resource index, and carrier information and BWPs corresponding to these indexes, about a receive beam corresponding to one or more groups of measurement results. When the foregoing information does not include the carrier information, the network device may consider, by default, the carrier information corresponding to these indexes as carrier information of a primary cell in a current serving cell. In addition, the terminal may further send coordinate information of the terminal to the network device, for example, orientation information of the terminal, orientation information of an antenna panel of the terminal, and relative spatial information or absolute spatial information for receiving or sending an uplink RS or a downlink RS. The spatial information may be obtained through signal measurement, a sensor, and the like.

Figure 6:
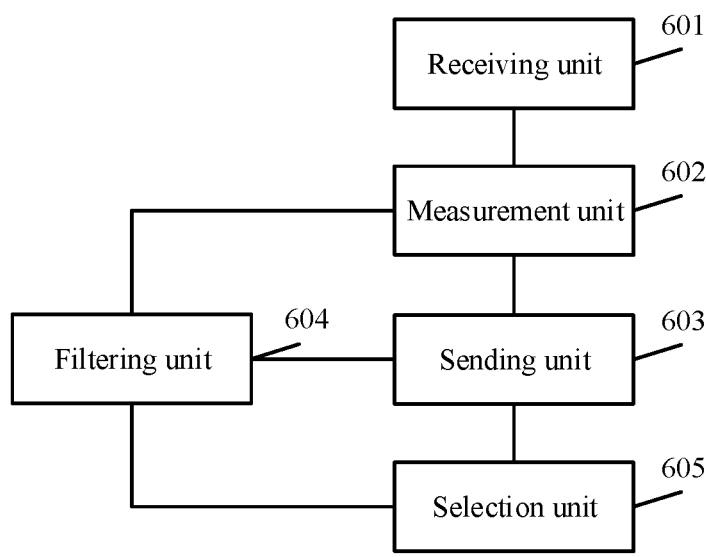
FIG. 6 is a schematic structural diagram of a terminal according to an embodiment of the present invention.

Based on a same concept as the network architecture shown in FIG. 1 and the communication method in the foregoing embodiments, FIG. 6 is a schematic structural diagram of a terminal according to an embodiment of the present invention. The terminal may be used for the communication methods shown in FIG. 2 and FIG. 5. As shown in FIG. 6, the terminal may include:
   a receiving unit 601, configured to receive a measurement indication from a network device, where
   the receiving unit 601 is further configured to receive RSs from the network device, where the RSs are used for positioning measurement;
   a measurement unit 602, configured to measure the RSs based on the measurement indication received by the receiving unit 601; and
   a sending unit 603, configured to send, to the network device, one or more groups of measurement results measured by the measurement unit 602, where RSs corresponding to each group of measurement results have an association relationship, and the association relationship may include that each group of measurement results is measurement results of a same receive beam.

In an embodiment, the terminal may further include:
   a filtering unit 604, configured to filter, by using a layer 1 and/or layer 3 filter, measurement results that are measured by the measurement unit 602 and that are of one or more transmit beams received by using a same receive beam, to obtain M groups of measurement results, where each of the M groups of measurement results is the measurement results of a same receive beam.

In an embodiment, the receiving unit 601 is further configured to receive first configuration information from the network device, where the first configuration information is configuration information of the RSs.

In an embodiment, the first configuration information may include one or more groups of RSs, RSs in each of the one or more groups of RSs have an association relationship, and the association relationship includes that each group of RSs is measured by using a same receive beam.

In an embodiment, the first configuration information includes one or more groups of RSs, and the receiving unit 601 is further configured to receive indication signaling from the network device, where the indication signaling is used to indicate that RSs in each of the one or more groups of RSs have an association relationship, and the association relationship includes that each group of RSs is measured by using a same receive beam.

In an embodiment, the receiving unit 601 is further configured to receive indication signaling from the network device, where the indication signaling is used to indicate to use a same receive beam for each time of measurement, or to use a same receive beam for measurement of RSs having an association relationship.

In an embodiment, the association relationship may further include:
   the RSs corresponding to each group of measurement results or each group of RSs are/is RSs that meet any one of the following conditions:
   being associated with a same TCI state;
   being in a same cell;
   being in a same cell group;
   being of a same type;
   being in a same RS set;
   having a spatial QCL relationship;
   having a spatial QCL relationship with a same RS;
   having a spatial QCL relationship with RSs in a same cell; and
   being associated with a TCI state including spatial QCL, where RS resources corresponding to the spatial QCL are in a same cell or have a spatial QCL relationship.

In an embodiment, the sending unit 603 is specifically configured to send one or more of the M groups of measurement results obtained by the filtering unit 604 to the network device.

In an embodiment, the receiving unit 601 is further configured to receive second configuration information from the network device, where the second configuration information is configuration information about RS measurement and reporting.

In an embodiment, the terminal may further include:
   a selection unit 605, configured to: select, from transmit beams included in each of the M groups of measurement results obtained by the filtering unit 604, a transmit beam that meets a requirement of the second configuration information, to obtain selected M groups of measurement results, and/or select one or more groups of measurement results from the M groups of measurement results or selected M groups of measurement results based on the second configuration information.

In an embodiment, the second configuration information may include at least one of a transmit beam reporting threshold, a minimum quantity of transmit beams to be reported, a maximum quantity of transmit beams to be reported, a receive beam reporting threshold, a minimum quantity of receive beams to be reported, a maximum quantity of receive beams to be reported, a quantity of measurement result groups to be reported, or a criterion for selecting a measurement result group to be reported.

For more detailed descriptions of the receiving unit 601, the measurement unit 602, the sending unit 603, the filtering unit 604, and the selection unit 605, directly refer to related descriptions of the terminal in the method embodiments shown in FIG. 2 and FIG. 5. Details are not described herein again.

Figure 7:
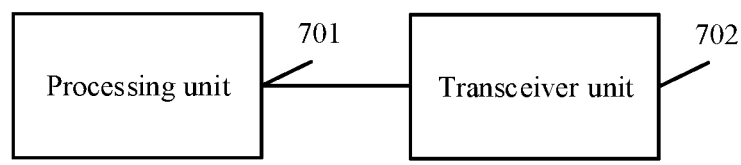
FIG. 7 is a schematic structural diagram of a network device according to an embodiment of the present invention.

Based on a same concept as the network architecture shown in FIG. 1 and the communication method in the foregoing embodiments, FIG. 7 is a schematic structural diagram of a network device according to an embodiment of the present invention. The network device may be used for the communication methods shown in FIG. 2 and FIG. 5. As shown in FIG. 7, the network device may include a processing unit 701 and a transceiver unit 702. The processing unit 701 is configured to:

control the transceiver unit 702 to send a measurement indication to the terminal, where the measurement indication is used to indicate the terminal to measure RSs;

control the transceiver unit 702 to send the RSs to the terminal, where the RSs are used for positioning measurement; and control the transceiver unit 702 to receive one or more groups of measurement results sent by the terminal, where RSs corresponding to each group of measurement results have an association relationship, and the association relationship may include that each group of measurement results is measurement results of a same receive beam.

In an embodiment, the one or more groups of measurement results are one or more of M groups of measurement results obtained by the terminal by filtering, by using a layer 1 and/or layer 3 filter, measurement results of one or more transmit beams received by using a same receive beam.

In an embodiment, the processing unit 701 is further configured to control the transceiver unit 702 to send first configuration information to the terminal, where the first configuration information is configuration information of the RSs.

In an embodiment, the first configuration information may include one or more groups of RSs, RSs in each of the one or more groups of RSs have an association relationship, and the association relationship includes that each group of RSs is measured by using a same receive beam.

In an embodiment, the first configuration information includes one or more groups of RSs, and the processing unit 701 is further configured to control the transceiver unit 702 to send indication signaling to the terminal, where the indication signaling is used to indicate that RSs in each of the one or more groups of RSs have an association relationship, and the association relationship includes that each group of RSs is measured by using a same receive beam.

In an embodiment, the processing unit 701 is further configured to control the transceiver unit 702 to send indication signaling to the terminal, where the indication signaling is used to indicate to use a same receive beam for each time of measurement, or to use a same receive beam for measurement of RSs having an association relationship.

In an embodiment, the association relationship may further include:

the RSs corresponding to each group of measurement results or each group of RSs are/is RSs that meet any one of the following conditions:

being associated with a same TCI state;
being in a same cell;
being in a same cell group;
being of a same type;
being in a same RS set;
having a spatial QCL relationship;
having a spatial QCL relationship with a same RS;
having a spatial QCL relationship with RSs in a same cell; and
being associated with a TCI state including spatial QCL, where RS resources corresponding to the spatial QCL are in a same cell or have a spatial QCL relationship.

In an embodiment, the processing unit 701 is further configured to control the transceiver unit 702 to send second configuration information to the terminal, where the second configuration information is configuration information about RS measurement and reporting.

In an embodiment, the one or more groups of measurement results are one or more of selected M groups of measurement results obtained by using transmit beams that are selected from transmit beams included in each of the M groups of measurement results and that meet a requirement of the second configuration information, and/or one or more groups of measurement results selected from the M groups of measurement results or selected M groups of measurement results based on the second configuration information.

In an embodiment, the second configuration information may include at least one of a transmit beam reporting threshold, a minimum quantity of transmit beams to be reported, a maximum quantity of transmit beams to be reported, a receive beam reporting threshold, a minimum quantity of receive beams to be reported, a maximum quantity of receive beams to be reported, a quantity of measurement result groups to be reported, or a criterion for selecting a measurement result group to be reported.

For more detailed descriptions of the processing unit 701 and the transceiver unit 702, directly refer to related descriptions of the network device in the method embodiments shown in FIG. 2 and FIG. 5. Details are not described herein.

Figure 8:
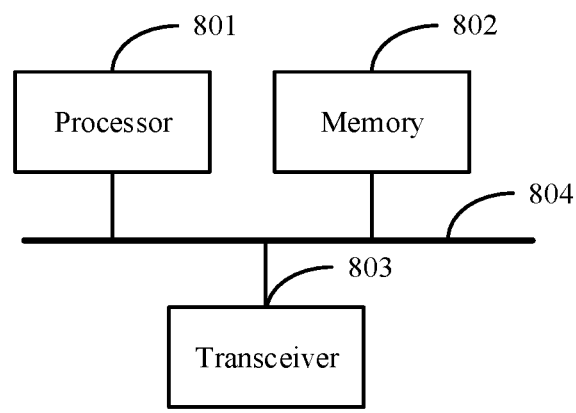
FIG. 8 is a schematic structural diagram of a communications apparatus according to an embodiment of the present invention.

FIG. 8 is a schematic structural diagram of a communications apparatus according to an embodiment of the present invention. As shown in FIG. 8, the communications apparatus may include a processor 801, a memory 802, a transceiver 803, and a bus 804. The processor 801 may be a general-purpose central processing unit (CPU), a plurality of CPUs, a microprocessor, an application-specific integrated circuit (ASIC), or one or more integrated circuits that are configured to control program execution of solutions in the present invention. The memory 902 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 902 is not limited thereto. The memory 802 may exist independently, or may be integrated into the processor 801. The bus 804 is connected to the processor 801. The bus 804 may include a channel, and is used to transmit information between the foregoing components. The transceiver 803 may be a transceiver antenna, or may be another transceiver component, for example, a radio frequency transceiver, or a signal transceiver interface.

In an embodiment, the communications apparatus may be a terminal, where
  the transceiver 803 is configured to receive a measurement indication from a network device;
  the transceiver 803 is further configured to receive RSs from the network device, where the RSs are used for positioning measurement;
  the memory 802 stores a group of program code, and the processor 801 is configured to: invoke the program code stored in the memory 802 to perform the following operation; and
  measure the RSs based on the measurement indication; and
  the transceiver 803 is further configured to send one or more groups of measurement results to the network device, where RSs corresponding to each group of measurement results have an association relationship, and the association relationship may include that each group of measurement results is measurement results of a same receive beam.

In an embodiment, the processor 801 is further configured to invoke the program code stored in the memory 802, to perform the following operation:
  filtering, by using a layer 1 and/or layer 3 filter, measurement results of one or more transmit beams received by using a same receive beam, to obtain M groups of measurement results, where each of the M groups of measurement results is the measurement results of a same receive beam.

In an embodiment, the transceiver 803 is further configured to receive first configuration information from the network device, where the first configuration information is configuration information of the RSs.

In an embodiment, the first configuration information includes one or more groups of RSs, RSs in each of the one or more groups of RSs have an association relationship, and the association relationship includes that each group of RSs is measured by using a same receive beam.

In an embodiment, the first configuration information includes one or more groups of RSs, and the transceiver 803 is further configured to receive indication signaling from the network device, where the indication signaling is used to indicate that RSs in each of the one or more groups of RSs have an association relationship, and the association relationship includes that each group of RSs is measured by using a same receive beam.

In an embodiment, the transceiver 803 is further configured to receive indication signaling from the network device, where the indication signaling is used to indicate to use a same receive beam for each time of measurement, or to use a same receive beam for measurement of RSs having an association relationship.

In an embodiment, the association relationship further includes:
  the RSs corresponding to each group of measurement results or each group of RSs are/is RSs that meet any one of the following conditions:
  being associated with a same TCI state;
  being in a same cell;
  being in a same cell group;
  being of a same type;
  being in a same RS set;
  having a spatial QCL relationship;
  having a spatial QCL relationship with a same RS;
  having a spatial QCL relationship with RSs in a same cell; and
  being associated with a TCI state including spatial QCL, where RS resources corresponding to the spatial QCL are in a same cell or have a spatial QCL relationship.

In an embodiment, that the transceiver 803 sends one or more groups of measurement results to the network device includes:
  sending one or more of the M groups of measurement results to the network device.

In an embodiment, the transceiver 803 is further configured to receive second configuration information from the network device, where the second configuration information is configuration information about RS measurement and reporting.

In an embodiment, the processor 801 is further configured to invoke the program code stored in the memory 802, to perform the following operation:
  selecting, from transmit beams included in each of the M groups of measurement results, a transmit beam that meets a requirement of the second configuration information, to obtain selected M groups of measurement results; and/or
  selecting one or more groups of measurement results from the M groups of measurement results or selected M groups of measurement results based on the second configuration information.

In an embodiment, the second configuration information may include at least one of a transmit beam reporting threshold, a minimum quantity of transmit beams to be reported, a maximum quantity of transmit beams to be reported, a receive beam reporting threshold, a minimum quantity of receive beams to be reported, a maximum quantity of receive beams to be reported, a quantity of measurement result groups to be reported, or a criterion for selecting a measurement result group to be reported.

Step 203, step 204, step 504, and step 505 may be performed by the processor 801 and the memory 802 in the terminal. A step of receiving measurement indication by a terminal side in step 201 and step 501, a step of receives the RSs by a terminal side in step 202 and step 502, and a step of receiving the indication information by the terminal side in step 503, step 205, and step 506 may be performed by the transceiver 803 in the terminal.

The measurement unit 602, the filtering unit 604, and the selection unit 605 may be implemented by the processor 801 and the memory 802 in the terminal, and the receiving unit 601 and the sending unit 603 may be implemented by the transceiver 803 in the terminal.

The terminal may be further configured to perform various methods performed by the terminal in the foregoing method embodiments. Details are not described again.

In another embodiment, the communications apparatus may be a network device, where the memory 802 stores a group of program code, and the processor 801 is configured to invoke the program code stored in the memory 802 to control the transceiver 803 to perform the following operations:

sending a measurement indication to a terminal, where the measurement indication is used to indicate the terminal to measure RSs;

sending the RSs to the terminal, where the RSs are used for positioning measurement; and receiving one or more groups of measurement results sent by the terminal, where RSs corresponding to each group of measurement results have an association relationship, and the association relationship includes that each group of measurement results is measurement results of a same receive beam.

In an embodiment, the one or more groups of measurement results are one or more of M groups of measurement results obtained by the terminal by filtering, by using a layer 1 and/or layer 3 filter, measurement results of one or more transmit beams received by using a same receive beam.

In an embodiment, the processor 801 is further configured to invoke the program code stored in the memory 802, to control the transceiver 803 to perform the following operation:

sending first configuration information to the terminal, where the first configuration information is configuration information of the RSs.

In an embodiment, the first configuration information includes one or more groups of RSs, RSs in each of the one or more groups of RSs have an association relationship, and the association relationship may include that each group of RSs is measured by using a same receive beam.

In an embodiment, the first configuration information may include one or more groups of RSs, and the processor 801 is further configured to invoke the program code stored in the memory 802, to control the transceiver 803 to perform the following operation:

sending indication signaling to the terminal, where the indication signaling is used to indicate that RSs in each of the one or more groups of RSs have an association relationship, and the association relationship may include that each group of RSs is measured by using a same receive beam.

In an embodiment, the processor 801 is further configured to invoke the program code stored in the memory 802, to control the transceiver 803 to perform the following operation:

sending indication signaling to the terminal, where the indication signaling is used to indicate to use a same receive beam for each time of measurement, or to use a same receive beam for measurement of RSs having an association relationship.

In an embodiment, the association relationship may further include:

the RSs corresponding to each group of measurement results or each group of RSs are/is RSs that meet any one of the following conditions:

being associated with a same TCI state;
being in a same cell;
being in a same cell group;
being of a same type;
being in a same RS set;
having a spatial QCL relationship;
having a spatial QCL relationship with a same RS;
having a spatial QCL relationship with RSs in a same cell; and being associated with a TCI state including spatial QCL, where RS resources corresponding to the spatial QCL are in a same cell or have a spatial QCL relationship.

In an embodiment, the processor 801 is further configured to invoke the program code stored in the memory 802, to control the transceiver 803 to perform the following operation:

sending second configuration information to the terminal, where the second configuration information is configuration information about RS measurement and reporting.

In an embodiment, the one or more groups of measurement results are one or more of selected M groups of measurement results obtained by using transmit beams that are selected from transmit beams included in each of the M groups of measurement results and that meet a requirement of the second configuration information, and/or one or more groups of measurement results selected from the M groups of measurement results or selected M groups of measurement results based on the second configuration information.

In an embodiment, the second configuration information may include at least one of a transmit beam reporting threshold, a minimum quantity of transmit beams to be reported, a maximum quantity of transmit beams to be reported, a receive beam reporting threshold, a minimum quantity of receive beams to be reported, a maximum quantity of receive beams to be reported, a quantity of measurement result groups to be reported, or a criterion for selecting a measurement result group to be reported.

Step 201, step 202, step 501, step 502, step 503, and a step of receiving the one or more groups of measurement results by a network device side in step 205 and step 506 may be performed by the processor 801, the memory 802, and the transceiver 803 in the network device.

The processing unit 701 and the transceiver unit 702 may be implemented by the processor 801, the memory 802, and the transceiver 803 in the network device.

The network device may be further configured to perform various methods performed by the network device in the foregoing method embodiments. Details are not described again.

An embodiment of the present invention further discloses a readable storage medium. The readable storage medium stores a program. When the program is run, the communication methods shown in FIG. 2 and FIG. 5 are implemented.

A person skilled in the art should be aware that in the one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another place. The storage medium may be any available medium accessible to a general-purpose or dedicated computer.

In another embodiment of this application, a computer program product is further provided. The computer program product includes computer instructions stored in the foregoing computer-readable storage medium.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. A communication method, wherein the communication method is applied in a terminal in a positioning system, wherein the method comprises:
   receiving, by the terminal, a measurement indication;
   receiving, by the terminal, reference signals and measuring the reference signals based on the measurement indication, wherein the reference signals are used for positioning measurement; and
   sending, by the terminal, one or more groups of measurement results, wherein reference signals corresponding to each group of measurement results have an association relationship, and the association relationship comprises that each group of measurement results includes measurement results of a same receive beam;
   wherein each of the measurement results in the one or more groups of measurement results is a reference signal receiving power of a first path, wherein the first path is a channel with a minimum delay in channels whose power is greater than a power threshold or whose SINR (signal to interference plus noise ratio) is greater than a SINR threshold, wherein the measurement results in the one or more groups of measurement results are used to determine an angle of departure.

2. The method according to claim 1, wherein the method further comprises:
   filtering, by the terminal using a layer 1 and/or layer 3 filter, measurement results of one or more transmit beams received using a same receive beam, to obtain M groups of measurement results, wherein each of the M groups of measurement results includes the measurement results of the same receive beam.

3. The method according to claim 1, wherein the method further comprises:
   receiving, by the terminal, indication signaling, wherein the indication signaling is used to indicate to use a same receive beam for each time of measurement, or to use a same receive beam for measurement of reference signals having an association relationship.

4. The method according to claim 1, wherein the association relationship further comprises that the reference signals corresponding to each group of measurement results or each group of reference signals include reference signals that meet any one of the following conditions:
   being associated with a same transmission configuration indicator state;
   being in a same cell;
   being in a same cell group;
   being of a same type;
   being in a same reference signal set;
   having a spatial quasi co-location relationship;
   having a spatial quasi co-location relationship with a same reference signal;
   having a spatial quasi co-location relationship with reference signals in a same cell; or
   being associated with a transmission configuration indicator state comprising a spatial quasi co-location relationship, wherein reference signal resources corresponding to the spatial quasi co-location are in a same cell or have a spatial quasi co-location relationship.

5. The method according to claim 1, wherein the sending, by the terminal, the one or more groups of measurement results comprises:
   sending, by the terminal, one or more of the M groups of measurement results.

6. The method according to claim 2, wherein the method further comprises:
   receiving, by the terminal, second configuration information, wherein the second configuration information is configuration information about reference signal measurement and reporting.

7. The method according to claim 6, wherein the method further comprises:
   selecting, from transmit beams comprised in each of the M groups of measurement results, a transmit beam that meets a requirement of the second configuration information, to obtain selected M groups of measurement results; and/or
   selecting one or more groups of measurement results from the M groups of measurement results or selected M groups of measurement results based on the second configuration information.

8. The method according to claim 6, wherein the second configuration information comprises at least one of a transmit beam reporting threshold, a minimum quantity of transmit beams to be reported, a maximum quantity of transmit beams to be reported, a receive beam reporting threshold, a minimum quantity of receive beams to be reported, a maximum quantity of receive beams to be reported, a quantity of measurement result groups to be reported, or a criterion for selecting a measurement result group to be reported.

9. A terminal, wherein the terminal is a terminal in a positioning system, wherein the terminal comprises:
   a transceiver; and
   a processor;
   wherein the transceiver is configured to:
   receive a measurement indication, and
   receive reference signals, wherein the reference signals are used for positioning measurement;
   wherein the processor is configured to measure the reference signals based on the measurement indication received by the transceiver;
   wherein the transceiver is further configured to send one or more groups of measurement results measured by the processor, wherein reference signals corresponding to each group of measurement results have an association relationship, and the association relationship comprises that each group of measurement results includes measurement results of a same receive beam; and
   wherein each of the measurement results in the one or more groups of measurement results is a reference signal receiving power of a first path, wherein the first path is a channel with a minimum delay in channels whose power is greater than a power threshold or whose SINR (signal to interference plus noise ratio) is greater than a SINR threshold, wherein the measurement results in the one or more groups of measurement results are used to determine an angle of departure.

10. The terminal according to claim 9, wherein the processor is further configured to:
    filter, using a layer 1 and/or layer 3 filter, measurement results that are measured by the processor and that are of one or more transmit beams received using a same receive beam, to obtain M groups of measurement results, wherein each of the M groups of measurement results includes the measurement results of same receive beam.

11. The terminal according to claim 9, wherein the transceiver is further configured to:
receive indication signaling, wherein the indication signaling is used to indicate to use a same receive beam for each time of measurement, or to use a same receive beam for measurement of reference signals having an association relationship.

12. The terminal according to claim 9, wherein the association relationship further comprises that the reference signals corresponding to each group of measurement results or each group of reference signals include reference signals that meet any one of the following conditions:
being associated with a same transmission configuration indicator state;
being in a same cell;
being in a same cell group;
being of a same type;
being in a same reference signal set;
having a spatial quasi co-location relationship;
having a spatial quasi co-location relationship with a same reference signal;
having a spatial quasi co-location relationship with reference signals in a same cell; or
being associated with a transmission configuration indicator state comprising a spatial quasi co-location relationship, wherein reference signal resources corresponding to the spatial quasi co-location are in a same cell or have a spatial quasi co-location relationship.

13. The terminal according to claim 10, wherein the transceiver is configured to send one or more groups of measurement results in the M groups of measurement results.

14. The terminal according to claim 10, wherein the transceiver is further configured to:
receive second configuration information, wherein the second configuration information is configuration information about reference signal measurement and reporting.

15. The terminal according to claim 14, wherein the processor is further configured to:
select, from transmit beams comprised in each of the M groups of measurement results, a transmit beam that meets a requirement of the second configuration information, to obtain selected M groups of measurement results, and/or select one or more groups of measurement results from the M groups of measurement results or selected M groups of measurement results based on the second configuration information.

16. The terminal according to claim 14, wherein the second configuration information comprises at least one of a transmit beam reporting threshold, a minimum quantity of transmit beams to be reported, a maximum quantity of transmit beams to be reported, a receive beam reporting threshold, a minimum quantity of receive beams to be reported, a maximum quantity of receive beams to be reported, a quantity of measurement result groups to be reported, or a criterion for selecting a measurement result group to be reported.

17. A network device, wherein the network device is a network device in a positioning system, wherein the network device comprises:
a transceiver; and
a processor, wherein the processor is configured to:
control the transceiver to send reference signals to at least one terminal, wherein the reference signals are used for positioning measurement; and
control the transceiver to receive one or more groups of measurement results from the at least one terminal, wherein reference signals corresponding to each group of measurement results have an association relationship, and the association relationship comprises that each group of measurement results includes measurement results of a same receive beam, and wherein each of the measurement results in the one or more groups of measurement results is a reference signal receiving power of a first path, wherein the first path is a channel with a minimum delay in channels whose power is greater than a power threshold or whose SINR (signal to interference plus noise ratio) is greater than a SINR threshold, wherein the measurement results in the one or more groups of measurement results are used to determine an angle of departure.

18. The network device according to claim 17, wherein the processor is further configured to:
control the transceiver to send indication signaling to the at least one terminal, wherein the indication signaling is used to indicate to use a same receive beam for each time of measurement, or to use a same receive beam for measurement of reference signals having an association relationship.

19. The network device according to claim 17, wherein the association relationship further comprises that the reference signals corresponding to each group of measurement results or each group of reference signals include reference signals that meet any one of the following conditions:
being associated with a same transmission configuration indicator state;
being in a same cell;
being in a same cell group;
being of a same type;
being in a same reference signal set;
having a spatial quasi co-location relationship;
having a spatial quasi co-location relationship with a same reference signal;
having a spatial quasi co-location relationship with reference signals in a same cell; or
being associated with a transmission configuration indicator state comprising spatial quasi co-location, wherein reference signal resources corresponding to the spatial quasi co- location are in a same cell or have a spatial quasi co-location relationship.

20. The network device according to claim 17, wherein the processor is further configured to control the transceiver to send second configuration information to the at least one terminal, and the second configuration information is configuration information about reference signal measurement and reporting.

* * * * *

UNITED STATES PATENT AND TRADEMARK OFFICE
CERTIFICATE OF CORRECTION

PATENT NO. : 12,096,262 B2
APPLICATION NO. : 17/339698
DATED : September 17, 2024
INVENTOR(S) : Chen et al.

Page 1 of 1

It is certified that error appears in the above-identified patent and that said Letters Patent is hereby corrected as shown below:

In the Claims

Claim 10: Column 28, Line 66: "results includes the measurement results of same" should read as -- results includes the measurement results of the same --.

Signed and Sealed this
Thirteenth Day of May, 2025

Coke Morgan Stewart
*Acting Director of the United States Patent and Trademark Office*